(12) United States Patent
Lipsanen et al.

(10) Patent No.: US 7,779,154 B2
(45) Date of Patent: Aug. 17, 2010

(54) MOBILE TELECOMMUNICATION NETWORKS AND DIGITAL BROADCASTING SERVICES

(75) Inventors: Matti Lipsanen, Turku (FI); Jouni Kämäräinen, Turku (FI)

(73) Assignee: Nokia Corporation, Espoo (FI)

( * ) Notice: Subject to any disclaimer, the term of this patent is extended or adjusted under 35 U.S.C. 154(b) by 1011 days.

(21) Appl. No.: 10/496,029

(22) PCT Filed: Nov. 18, 2002

(86) PCT No.: PCT/FI02/00912

§ 371 (c)(1),
(2), (4) Date: Sep. 27, 2004

(87) PCT Pub. No.: WO03/045064

PCT Pub. Date: May 30, 2003

(65) Prior Publication Data

US 2005/0043020 A1    Feb. 24, 2005

(30) Foreign Application Priority Data

Nov. 20, 2001    (FI) .................................. 20012256

(51) Int. Cl.
*G06F 15/173* (2006.01)
(52) U.S. Cl. ..................................... 709/239; 455/553.1
(58) Field of Classification Search ................. 709/203, 709/211, 217, 218, 219, 227, 228, 229, 239; 455/553.1
See application file for complete search history.

(56) References Cited

U.S. PATENT DOCUMENTS 4,751,578 A * 6/1988 Reiter et al. ................. 348/564

(Continued)

FOREIGN PATENT DOCUMENTS

EP    0 804 012 A3    9/1999

(Continued)

OTHER PUBLICATIONS

"Digital Video Broadcasting (DVB); Specification for Service Information (SI) in DVB systems", ETSI EN 300 468 V1.4.1 (Nov. 2000), European Standard (Telecommunications series), cover and pp. 6-12.

(Continued)

*Primary Examiner*—Saleh Najjar
*Assistant Examiner*—Marie Georges Henry
(74) *Attorney, Agent, or Firm*—Locke Lord Bissell & Liddell LLP

(57) ABSTRACT

At integrated hybrid telecommunication system for providing voice, packet data and digital broadcast/multicast services to a mobile terminal (100) is disclosed. In an embodiment of the invention, the system includes a mobile telecommunication network (110) for providing lower bandwidth services and a digital broadband network (140) for delivering higher bandwidth broadcast content. In an embodiment, a broadcast service such as a video broadcast can be viewed by selecting the service on e.g. a portal page displayed on the mobile terminal (100). The request is received by the mobile telecommunication network (110), which is coupled to the broadcast network (140) for retrieving the associated service parameters. The service parameters are transmitted to the mobile terminal (100) via the mobile telecommunication network (110). The received parameters enable a broadcast receiver in the mobile terminal (100) to receive the broadcast service transmitted by the broadcast network (140).

42 Claims, 10 Drawing Sheets

U.S. PATENT DOCUMENTS

| | | | | |
|---|---|---|---|---|
| 5,253,341 | A | * | 10/1993 | Rozmanith et al. .......... 709/247 |
| 5,557,541 | A | * | 9/1996 | Schulhof et al. .............. 700/94 |
| 5,740,075 | A | * | 4/1998 | Bigham et al. ............. 709/229 |
| 6,377,981 | B1 | * | 4/2002 | Ollikainen et al. .......... 709/217 |
| 6,401,077 | B1 | * | 6/2002 | Godden et al. ................ 705/26 |
| 6,741,841 | B1 | * | 5/2004 | Mitchell .................. 455/188.1 |
| 6,920,488 | B1 | * | 7/2005 | Le Pennec et al. .......... 709/219 |
| 6,965,770 | B2 | * | 11/2005 | Walsh et al. ............. 455/426.1 |
| 7,260,564 | B1 | * | 8/2007 | Lynn et al. ......................... 1/1 |
| 7,478,240 | B1 | * | 1/2009 | August et al. ............... 713/176 |
| 7,503,057 | B2 | * | 3/2009 | Rosin et al. .................... 725/44 |
| 2003/0028612 | A1 | * | 2/2003 | Lin et al. .................... 709/217 |

FOREIGN PATENT DOCUMENTS

| | | |
|---|---|---|
| EP | 0 876 029 A3 | 1/2000 |
| EP | 1 022 884 A1 | 7/2000 |
| GB | 2 313 981 A | 12/1997 |
| WO | WO 97/27546 | 7/1997 |
| WO | WO 99/33076 | 7/1999 |
| WO | WO 99/35771 | 7/1999 |
| WO | WO 00/25517 | 5/2000 |
| WO | WO 02/03727 A1 | 1/2002 |
| WO | WO 02/14990 A1 | 2/2002 |

OTHER PUBLICATIONS

Wolfgang Kellerer, et al. "IP based enchanced Data Casting Services over Radio Broadcast Networks", Munich University of Technology (TUM), Institute of Communication Networks, 2000, pp. 195-203.

Search Report of priority Finnish Application No. 20012256, Date of Issue: Sep. 10, 2002.

PCT International Search Report, International Application No. PCT/FI02/00912, Date of Completion of Search— Feb. 26, 2003, Sheets 1, 2, Continuation of Second Sheet and Patent Family Annex.

* cited by examiner

MOBILE TELECOMMUNICATION NETWORKS AND DIGITAL BROADCASTING SERVICES

FIELD OF THE INVENTION

The present invention relates generally to mobile telecommunication networks and, more particularly, to the delivery of digital services to wireless mobile terminals that are accessible though portal pages.

BACKGROUND OF THE INVENTION

The deployment of advanced high bit-rate mobile networks has opened up new opportunities for delivering a host of services in a way that was not possible with earlier second generation wireless networks. Third generation systems such as Universal Mobile Telephone Service (UMTS) or even lower bit-rate systems such as High Speed Circuit Switched Data (HSCSD) and General Packet Radio Service (GPRS) specified for use with the Global System for Mobile Communications (GSM) wireless standard, will enable the delivery of new digital services such as video calls and the playback of multimedia applications that are comprised of audio and video clips.

Although the increased bit-rates of UMTS systems widen the possibilities for providing digital services, many estimates forecast that these systems can reliably deliver data rates between 64 to 384 kbit's to moving mobile terminals. Bit bit rates of up to 2 Mbits can be achieved for stationary environments. These rates provide pretty good performance for delivering high quality digital audio and acceptable quality moving image clips. However, at these transfer rates it will be difficult to handle exceedingly high data Intensive tasks such as delivering high quality full-motion video and transferring very large data files to mobile terminals. Attempts at downloading huge data files will likely lead to inconveniently long downloading times which probably would not be the most economical in terms of cost per megabyte. For this and other reasons, alternative broadband delivery channels have been investigated that could provide a practical solution for high data intensive tasks in terms of lower cost and convenience for the parties involved.

One such delivery channel that has shown promise is Digital Video Broadcasting DVB-T). DVB-T, which is related to DVB-C (cable) and DVB-S (satellite), is the terrestrial variant of the DVB standard and is a wireless point-to-multipoint data delivery mechanism developed for digital TV broadcasting and based on the MPEG-2 transport stream for the transmission of video and synchronized audio. DVB has the capability of efficiently transmitting large amounts of data over a radio channel to a high number of users at a lower cost, when compared to data transmission through mobile telecommunication networks using e.g. UMTS/GPRS. DVB-T data rates have been shown to provide up to 4-20 Mbit/s, where the lower end of the range corresponds to reception within a very high speed (300 km/h) moving receiver. Another advantage of DVBT is that it has proven to be exceptionally robust in that it works well in geographic conditions that would normally affect other types of transmissions, such as the rapid changes of reception conditions, and hilly and mountainous terrain.

Digital broadband data broadcast networks are known. As mentioned, an example of such a network enjoying popularity in Europe and elsewhere world-wide is Digital Video Broadcast (DVB) which in addition to the delivery of televisual content is capable of delivering data. Other examples of broadband data broadcast networks that provided under the Advanced Television Systems Committee (ATSC). Both ATSC and DVB utilize a containerization technique in which content for transmission is placed into MPEG-2 packets which act as data containers. Thus, the containers can be utilized to transport any suitably digitized data including, but not limited to High Definition TV, multiple channel Standard definition TV (PAUNTSC or SECAM) and, of course, broadband multimedia data and interactive services.

The combined use of mobile telecommunications with a broadband delivery channel such as DVBT has been proposed in the past in order to achieve efficient delivery of digital services to users on the move. This would take advantage of existing infrastructures in the effort to provide personal communications (already prevalent) and the growing demand for Internet access, together with the expected rise of digital broadcasting, so that users can receive these services with a single device. Furthermore, DVB-T is a cross platform standard that is shared by many countries thereby making frequency compatibility and roaming less of an issue. The combination of the mobile telecom and at a relatively very low cost digital broadband channel provides the possibility of interactive services such as unidirectional and bidirectional services such as audio and video streaming (TV & Radio), file downloads and advanced gaming applications etc.

However, there are some challenges with developing the mobile terminals needed for combined use with e.g. DVB-T. A significant issue to consider is that power consumption for mobile terminals must be low enough to provide sufficient use while operating independently from power sources. DVB-T terminals have In the past had high power consumption rates which make them unsuitable for sustained use. This is partly due to the way DVB operates where receivers regularly access broadcast Service Information (DVB-SI) that accompany DVB signals which assist the receiver/decoder and the viewer to navigate through the array of services offered. The data is also necessary for the receiver/decoder to automatically configure itself to decode the received broadcast stream that is included in the Program Specific Information (PSI) specified by, for example, the MPEG-2 systems standard. The DVB-SI specifies additional data based on data tables that complement the PSI by providing data to aid in the automatic tuning of receiver/decoders and provides additional information intended for display to the user.

In the development of DVB-T, it was envisioned that signal reception would be mainly carried out by set-top boxes in generally stationary environments where power consumption issues were largely unimportant. However with reception by e.g. mobile handheld devices, the requirement of DVB-T to regularly access Service Information data tables places a heavy power burden on the terminal. This is especially the case when the SI tables are accessed even when the user does not want to view a program for some length of time. In mobile terminals that also operate as telecom devices, power consumption is a particularly important issue since users expect sufficiently reasonable battery life for necessary communication purposes which they expect to be available. At present, it is only possible to build DVB-T mobile receivers with only a few hours of operating time. With improved operating life, data packet based terminals can be left on practically all of the time fulfilling the promise of anytime and anywhere mobile communications.

In view of the foregoing, it is desirable to improve the operating times of mobile terminals that are operable with mobile telecommunication and digital broadcast networks.

SUMMARY OF THE INVENTION

Briefly described and in accordance with an embodiment and related features of the invention, in an apparatus aspect of the invention there is provided a system for providing services to a mobile terminal (100) characterized in that said services include broadband services and lower bandwidth services, comprising:

a mobile telecommunication network (110);

at least one mobile telecommunication service server (120) coupled to the mobile telecommunication network (110) for providing said lower bandwidth services;

a broadcast network (140);

at least one broadcast service server (130) coupled to the broadcast network (140) for providing broadband services; and a portal server (120) coupled to the mobile telecommunication network (110) and the at least one broadcast service server (130), said servers communicating with the mobile terminal (100) via the mobile telecommunication network (110) for providing information relative to the services.

In a related apparatus aspect of the invention there is provided a portal server coupled to a broadband network (140) and to a lower bandwidth network (110) for providing broadband and lower bandwidth service transmissions to a mobile terminal (100), characterized in that said portal server comprises:

means for accessing selectable service information relative to said broadband service transmissions;

means for accessing selectable service information relative to said lower bandwidth service transmissions; and a controller for selecting service information for said broadband and lower bandwidth service transmissions based on a service request by a user of the mobile terminal (100).

In a method aspect of the invention, there is provided a method of accessing a telecommunication system by a mobile terminal (100) for receiving voice, packet data, and broadcast services, wherein the telecommunication system is comprised of a mobile network (110) linked to a telecom server (120) and a portal server (120), a broadcast network (140) linked to a broadcast server (130) and to the mobile network (110), and wherein the mobile terminal (100) is capable of communicating with the mobile network (110) and receiving broadcasts from the broadcast network (140), the method is characterized in that the service information associated with a broadcast from the broadcast network (140) is obtained by the mobile terminal (100) via the mobile network (110), thereby lowering power consumption by the mobile terminal (100) by avoiding alternative high power actions for obtaining said information.

In a device aspect of the invention, there is provided a wireless handheld mobile terminal 100 for providing services to a user characterized in that said mobile terminal comprises:

a radio frequency transceiver for communicating with a mobile telecommunication network (110) for receiving lower bandwidth services;

a broadcast receiver for receiving broadband services from a digital broadcast network (140);

an input user interface (420) including selectable links to access service information relative to broadband and lower bandwidth services for entering user request to selected service to be transmitted via the mobile telecommunication network (110);

a CPU (404) connected to said radio frequency transceiver and to said broadcast receiver for controlling communication with the mobile telecommunication network (110) and the reception of broadband services; and a means for displaying requested service to the user.

In a product aspect, there is provided a computer program product comprising program instructions executable by a computing system for operating networks that provide mobile telecommunication services and digital broadcast content to a mobile terminal (100), comprising:

computer program code for receiving a user request from the mobile terminal for information relating to broadcast content sent via the mobile telecommunications network;

computer program code for executing the user request and sending the information to the mobile terminal (100) using packet data transmission;

computer program code for facilitating communication between a mobile telecommunication network (110) and a broadcast network (140) hosting the broadcast content; and computer program code for performing the transmission of broadcast content from the broadcast network (140) to the mobile terminal (100).

In a further apparatus aspect, an Electronic Program Guide (EPG) for comprising information on broadband services provided by a broadcast network (140), characterized in that the Electronic Program Guide information is accessible to a wireless mobile terminal via a portal page (160) communicated through a mobile telecommunication network (110), and wherein broadcast service parameters associated with a user selected broadcast service are sent via a portal server (120) coupled to the broadband network (140) and the mobile telecommunication network (110).

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

In the following description of the various embodiments, reference is made to the accompanying drawings which form a part hereof, and in which is shown by way of illustration of embodiments in which the invention may be practiced. It is to be understood that other embodiments may be utilized, and structural and functional modifications may be made without departing from the scope of the present invention. Although reference is made to a terrestrial digital video broadcasting network (DVB-T), it should be understood that the invention is applicable to any such digital broadband data broadcast network, and therefore the invention is not intended to be limited by references to DVBT.

In accordance with an embodiment of the invention, handheld mobile terminals such as those capable of performing mobile communications and receiving digital broadband data broadcasts is able to decrease power consumption by reducing the number of high power activities the terminal must perform. The telecom network as referred to herein includes all components of the mobile network and associated servers such as a telecom server and a portal server. In an embodiment of the invention, power conservation is achieved by increasing the period of time the terminal is inactive by eliminating the necessity for regularly accessing the service information data for DVB-T broadcasts. This step is normally taken periodically to monitor the transmitted bit stream to check what is currently being broadcasted in the air, as specified e.g. in DVB Document A038 Rev.1 "Specification for service information (SI) in DVB Systems, or ETSI EN 301 192.

Figure 1:
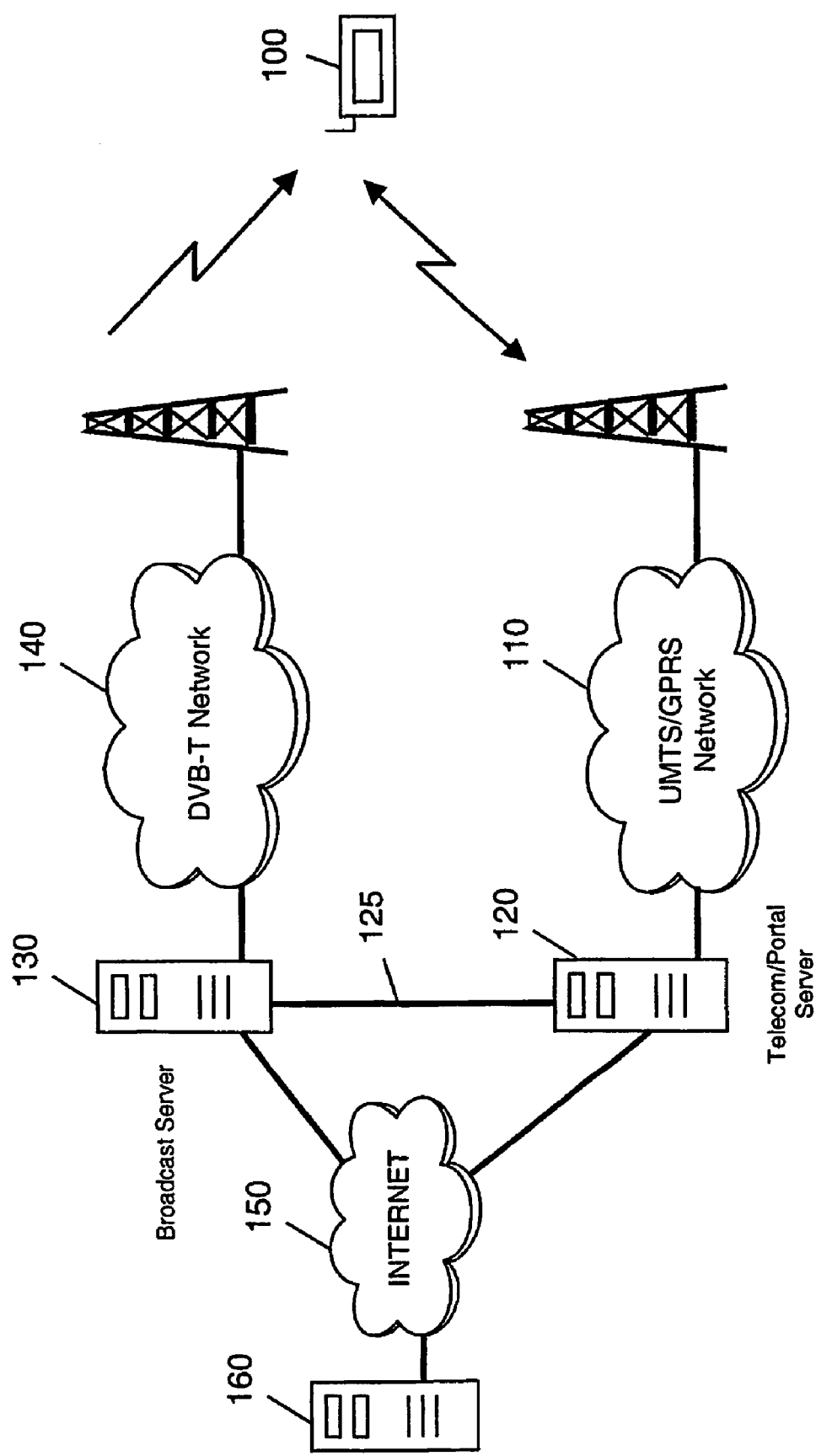
FIG. 1 illustrates a hybrid mobile telecom and DVB-T system operating in accordance with an embodiment of the invention.

FIG. 1 illustrates a hybrid mobile telecom and DVB-T system operating in accordance with the embodiment of the invention. The system provides an interactive capability for users using mobile terminal 100 via a return channel through e.g. a UMTS, GPRS, GSM, WAP or other cellular network (or any combination thereof) to select specific broadcast programs transmitted from the digital Broadcast network 140. The user first accesses a portal page hosted on the Telecorm/Portal server 120. The portal page may be, for example, a Wireless Application Protocol (WAP) page fetched from Telecom Server 120, in which various selectable links are displayed on terminal 100. The portal may be that of a general purpose page that contains links to a wide variety of services such as TV programs, games, music, news, banking, shopping etc. By way of example, when one wants to view a broadcasted TV program, the user selects the TV link which brings up a page that displays what is currently broadcasting in the air. The user could further select an option to begin reception of the TV program currently playing or some subsequent program, since the Broadcast server 130 typically broadcasts on a program schedule in carousel fashion.

The selection procedure begins when the user clicks a hyperlink "n" associated with a service on the portal page. After which the terminal browser sends "get n" message to the Telecom server 120. If hyperlink "n" is to a service provided by Broadcast server 130, the Telecom server 120 sends a request to the Broadcast server 130 to send service parameters such as the tuning frequency, port, IP address, Program Identifier (PID), cell location, media access control (MAC), bandwidth, fft, constellation, code rate, guard interval, hierarchy and/or hierarchical priority, time, that are needed by the terminal e.g. when the service is offered on top of Internet Protocol, as shown in Table 1. The Telecom server 120 forwards service parameters to terminal 100 via the UMTS/GPRS Network 110. From the received bit stream the terminal is able to determine the type of service. For example, if the desired stream is currently being broadcasted, the terminal turns on the broadcast receiver and launches a media player for playing back the stream. If the stream is e.g. a game application or music file that will be broadcasted in, for example, t+10 minutes, the terminal 100 turns on the broadcast receiver at t+10 minutes time in order to download and (optionally save) the file. When a future download is scheduled to occur at e.g. t+10 minutes, the terminal 100 can check the field strength at t+9 minutes and notify the user of a weak field in order to reposition the terminal for better reception.

TABLE 1

|  | Frequency | PID | PORT | IP Address | Time |
|---|---|---|---|---|---|
| Service | 783,25 | 13 bit number (0-8192 | 21 | 192.168.1.128 | 13.52.30–13.55.09 |

Typically only the necessary parameters related to the selected service are sent to the terminal, although it is possible to send parameters for all services which is generally unnecessary. The security issues such as encryption/decryption keys are typically handled by the native security provided by cellular channel in the WAP protocol, for example.

When a selected service resides on a server outside the system, such as banking services for example, a connection to an external server 160 can be achieved via the Internet 150 using standard WAP procedures, for example. A multitude of services are accessible by the user through the Internet 150 are available such as e.g. banking, placing stock trades, making airline reservations, and shopping (e-commerce) etc. In these cases only the mobile network 110 side is used such that any necessary secure connections are established using a security layer such as Wireless Transport Layer Security (WVTLS) in WAP, for example.

Figure 2:
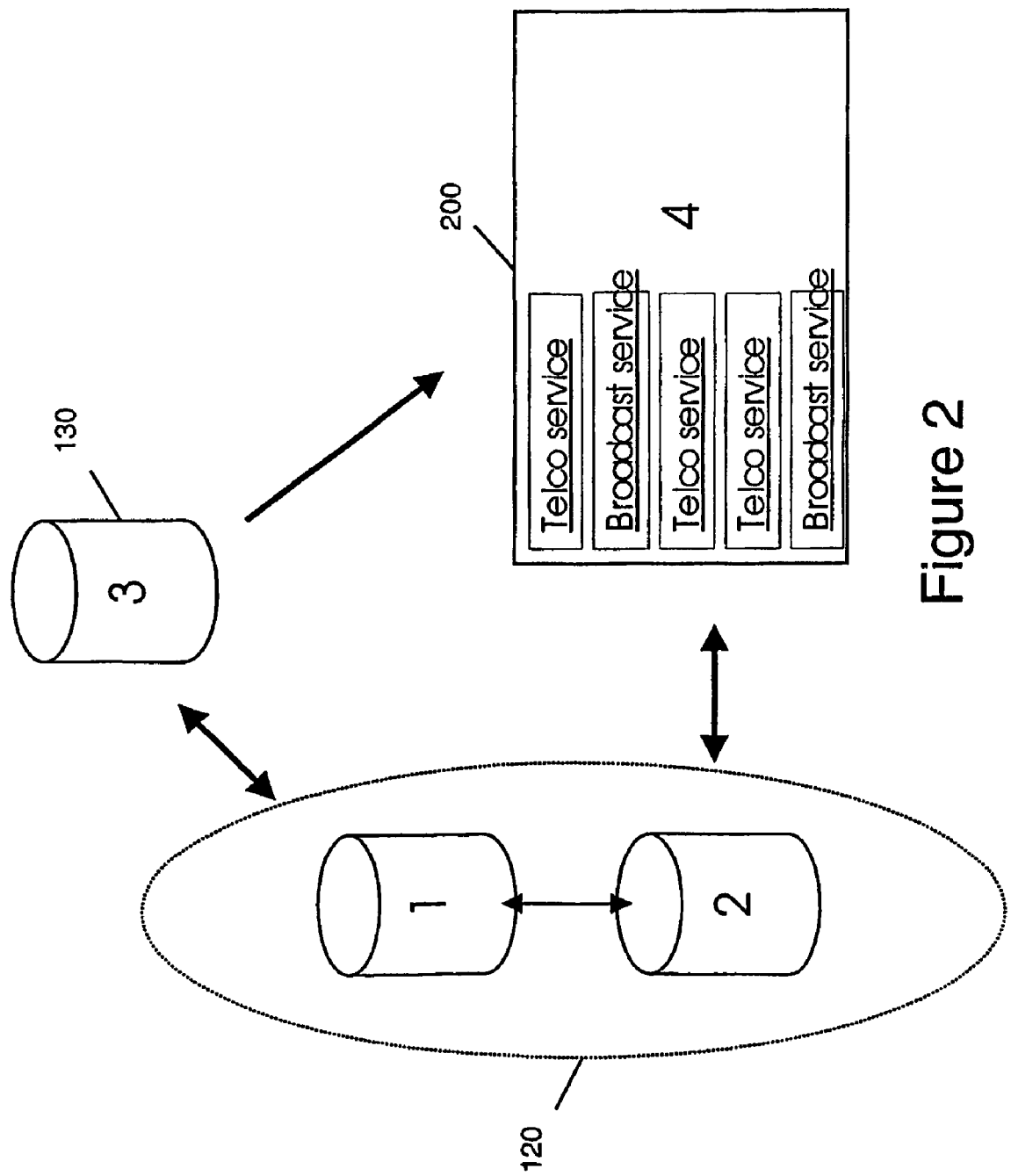
FIG. 2 depicts an exemplary portal and its interrelation with data content residing on the telecom and broadcast networks.

FIG. 2 depicts an exemplary portal and its interrelation with content residing on the telecom and broadcast networks. The terminal accesses the portal page 200 which is, for example, a WAP start or home page. The Telecom/Portal server 120 can consist of a single server or an n number of servers (where separate Telecom and Portal servers are shown). Broadcast server 130 can also consist of a plurality of servers which provide sufficiently large storage space for hosting content for the Broadcast Network. It should also be noted that the Telecom/Portal server 120 and Broadcast server 130 may be logical servers which do not have to be separate physical entities. In the figure, the portal start page is compiled on server 2 consisting of services on server 1 and 3 and perhaps containing services of web pages.

Figure 3:
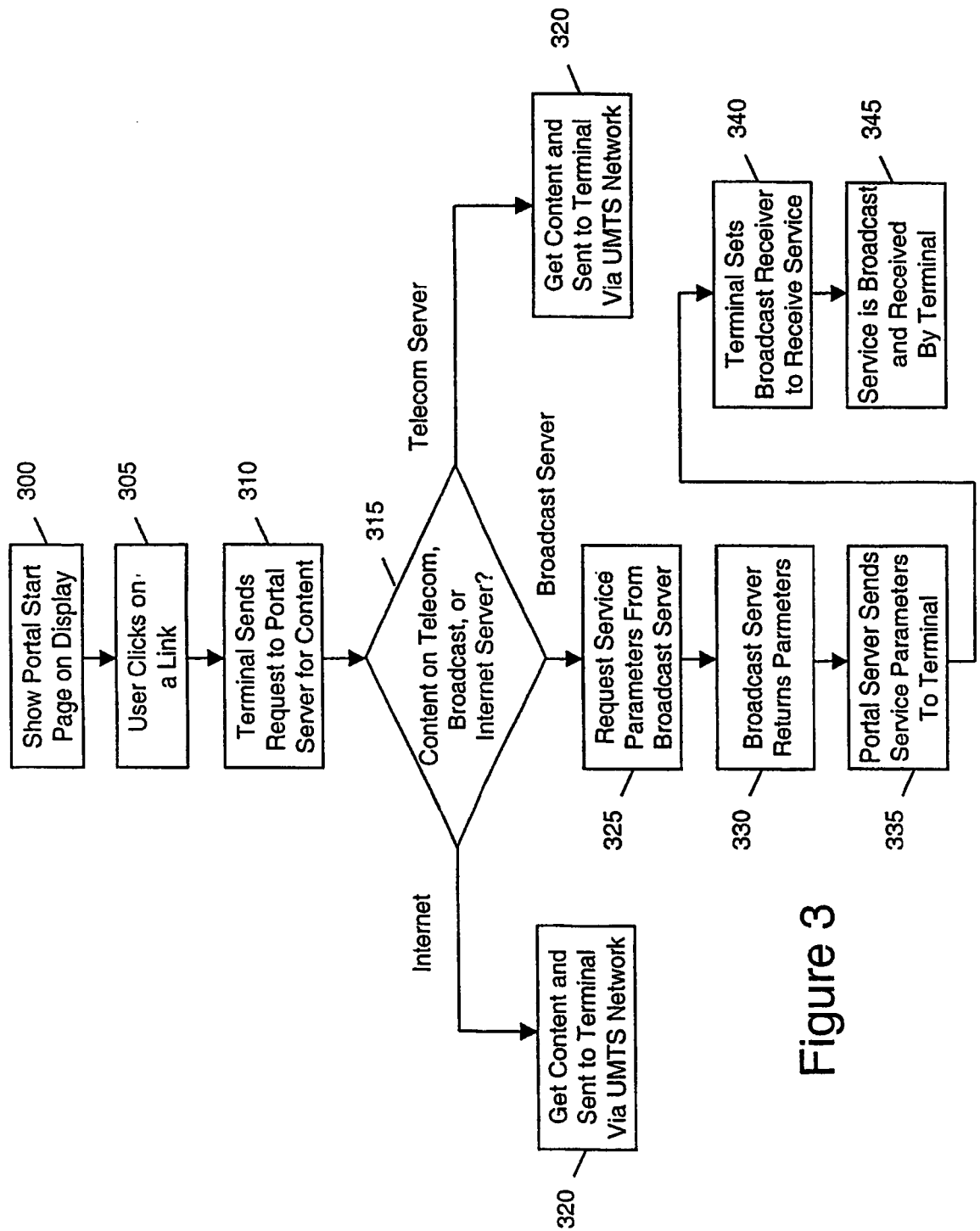
FIG. 3 is a flow diagram of a typical data access procedure operating in accordance with the embodiment of the present invention.

FIG. 3 is a flow diagram of a typical data access procedure operating in accordance with an embodiment of the present invention. In step 300, a portal start page is displayed on the terminal having a built-in browser when the device is switched on, for example. The portal page lists a plurality of links that may be in an arrangement that is predetermined or is customized by the user. The links on the portal page are often ones that are of most interest to the user. In step 305, the user selects a link by "clicking" on it which in turn causes the terminal to send a request (step 310) to the Portal Server 120 of the telecom network via e.g. the WAP protocol. The telecom network determines whether the desired content resides on the Telecom Server 120, Broadcast Server 130, or a server 160 on the Internet, as shown by step 315. If the content is hosted on Telecom Server 120, it is retrieved and sent to the terminal through the UMTS/GPRS network 110, as shown by step 320. If the content resides on an external Internet server 160, it is retrieved using standard Internet Protocol and sent to the terminal via the UMTS/GPRS network 110, also shown by step 320.

If the data is hosted on the Broadcast Server 130, the Portal server 120 makes a request (step 325) to receive the service parameters from the Broadcast Server 130 via link 125, as shown in step 330. The request and response may be routed through the link 125 or via the Internet 150 if the telecom network and the broadcast network are geographically distant, such as in different parts of a city or in different cities for example. The Portal server 120 sends the service parameters to the terminal vial the UMTS/GPRS network 110, as shown in step 335. The terminal sets the internal broadcast receiver (step 340) to receive the broadcast by tuning to the correct frequency and other tasks such as setting the right PID to demux, and if the services are on top of IP/TCP, UDP etc., the packets that have the right address and port number go to IP stack that handles IPsec, for example. The broadcast receiver is turned on in advance so that it has time to stabilize before the service is broadcasted, and such that the receiver is turned off after the broadcast.

A suitable media player is launched to begin playing the streamed broadcast on the terminal display, as shown by step 345. The media player is typically a software program executing on the terminal that may be upgradeable through the air via the telecom network. The level of the user's viewing privileges can be set by previous agreements with either the telecom or broadcast operators and regulated by the media player software e.g. to control access to pay per view programs or programs restricted from viewing.

A hybrid network portal may be implemented where services in many different networks can be accessed from a single point of access (portal). Some of the services are delivered through the telecom network and others by broadcast networks. This means that the broadcast receiver part of the terminal can be kept switched off when the broadcast services are not subscribed. In other words, the broadcast service parameters are sent using the telecom network instead of sending Electronic Program guide (EPG) or service announcement tables through broadcast network. Therefore, the broadcast receiving part of the terminals don't need to listen to the stream to know what services are available, thus eliminating the regularly occurring scans of the broadcast stream that are power consuming. A further advantage is that, when the user selects the TV link, the program information is retrieved immediately so it is not necessary for the information to be stored locally on the terminal, nor is it necessary for the terminal to wait for the next data broadcast to obtain the information as in the prior art. The method of the invention permits the user to have the possibility of selecting only those programs and/or files that they are interested in. The Broadcast Server 130 sends updates of the current broadcast to the Portal Server 120 which are suitably formatted for display on handheld devices such as mobile terminals.

Billing for the received broadcast services can be performed through normal telecom billing procedures. This is possible since all requests for services are routed through the telecom network is kept track of by a billing server associated with the network. These are typically the same components that are used for calculating the user's telecom and roaming charges using e.g. a ubiquitous GSW/UMTS billing platform. This technique would take advantage of existing infrastructure and permit users to receive broadcast services even while roaming and enables users to receive a single bill for all services used. The use of GPRS provides an attractive return channel since the user is billed for transferred data and not for the connection time.

One way that billing for broadcast services can be triggered is when e.g. the broadcast keys are sent to the user which allow the terminal to decrypt the digital packets, although other triggering events can be implemented in the system. The embodiment of the invention enables convenient billing for telecom services and digital services via a low cost broadband delivery channel. The content may be protected in various manners. DVB has specified Conditional access in e.g. document "SUPPORT FOR USE OF SCRAMBLING AND CONDITIONAL ACCESS WITHIN DIGITAL BROADCASTING SYSTEMS DVB DOCUMENT, A007 February 1997". If the content is distributed using Internet Protocol then, IPSec or IPv6 security can be used, and in which case, the telecommunication channel would most likely be used to exchange related information.

The terminal 100 used in the invention is a mobile terminal with the capability to receive digital broadcasts and access standard mobile telecommunications networks with voice and data services using UMTS/GPRS and WAP, for example. The terminal contains many standard mobile telecommunication components including a processor, memory (RAM and flash), and software such as a browser and a media player. A more detailed description of an interactive mobile terminal containing mobile telecommunications capability and DVB-T broadcast reception capability is given in International publication WO 01/17255 on behalf of the present Applicant. The terminal may also be fitted with a Digital Audio Broadcast (DAB) receiver for receiving digital audio broadcasts from radio stations or for receiving digital audio broadcasted using DVB-T and MPEG2 formats. It is also possible to equip the terminal with Bluetooth functionality for interacting with other Bluetooth compatible devices.

Figure 4:
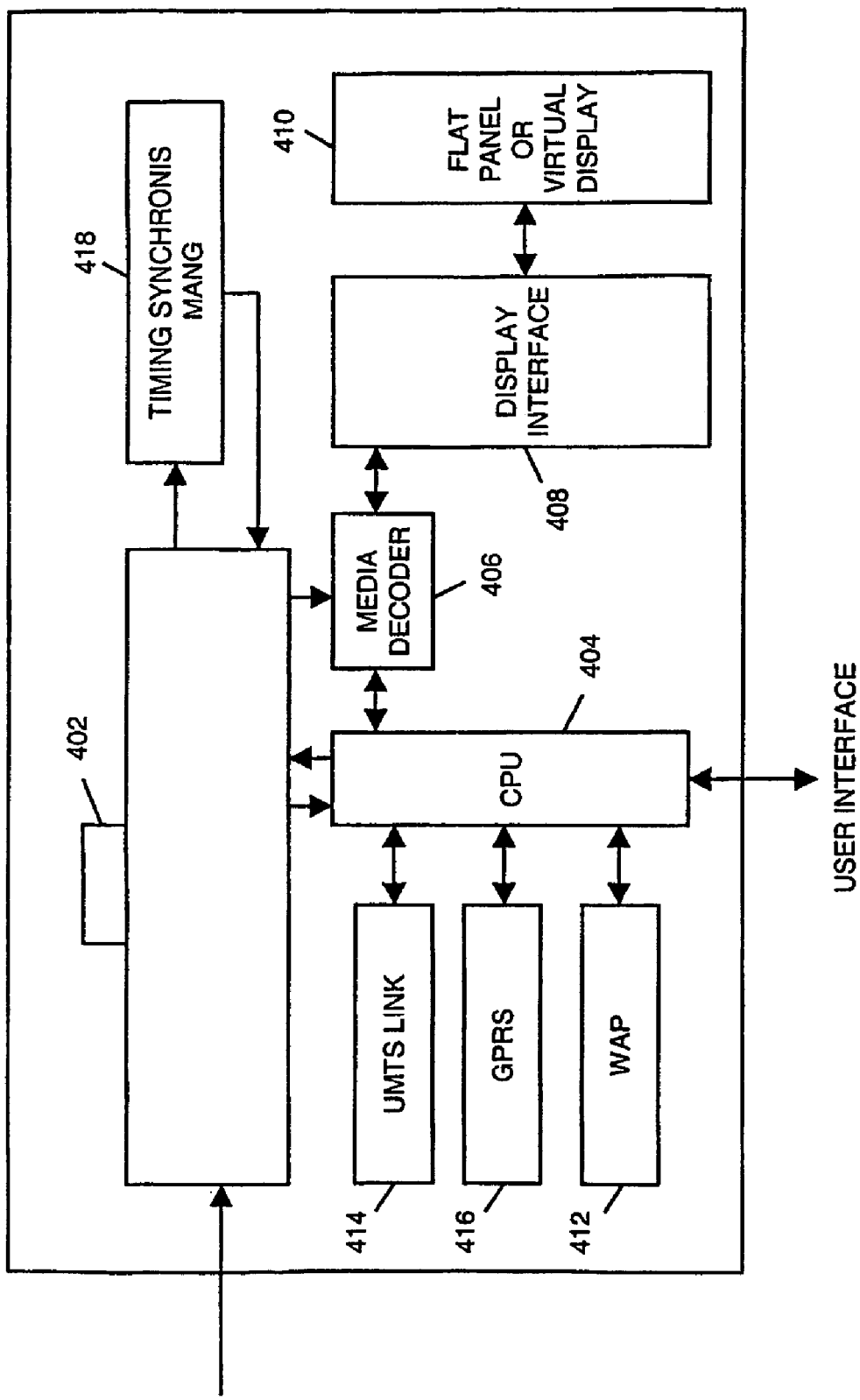
FIG. 4 shows a block diagram of the basic components in an exemplary mobile terminal (MMT) that is suitable for use with the embodiment of the invention.

FIG. 4 shows a block diagram of the basic components in an exemplary mobile terminal that is suitable for use with the embodiment of the invention. The mobile terminal 100 provides fully functioning wireless communications that operate in accordance with standard mobile telecommunications protocols such as UMTS/GPRS, GSM, CDMA, and TDMA, etc. Integrated in the mobile terminal is a DVB-T digital broadcast receiver, a digital display for providing user interactivity in a mobile environment for viewing broadcasts. The interactive messages can be sent to the telecom network using WAP or even SMS messaging. In the mobile terminal, a DVB-T receiver 402 is capable of receiving digital TV broadcasts in accordance with the DVB-T standard. In addition to TV broadcasts, channels in the DVB-T spectrum can be used to transmit digital data intended for receipt by specific users, which are typically encrypted for privacy and requiring encryption keys for playback.

A media decoder 406 is controlled by a CPU 404 and is used to decode the received DVB-T broadcast. The media decoder 406 can decode signals in e.g. MPEG-2 and MPEG-4 formats in the broadcast stream, or Real Media or Windows Media formats can be used in addition to others. Alternatively, the decoder can be selected to match other transmitted data protocols from the broadcasted service.

A display interface 408 receives the decoded broadcast from the media decoder 406. The display interface 408 is designed to optimize the display of data to a user of the MMT 400. For example, the digital data received can be in the form of a full-motion video movie or can be some other kind of graphic, since various formats require compatible modes to be optimally displayed. The display interface 408 acts as a video integrator e.g. it has the ability to place a graphics overlay onto a full-motion video and manipulate the display of the video by moving to another part of the display and cropping to show essential moving parts, for example. The output of the display interface 408 drives the display 410 of the mobile terminal 400. In the embodiment, the mobile terminal 400 is equipped with WAP capability 412 to provide a data connection to the telecom network via GPRS block 416. The UMTS block 414 provides circuit switched voice connections to the UMTS network and works together with the GPRS 416 for data communications to the network. All the components are controlled by CPU 404 in accordance with the environment. For example, when voice data is to be transmitted, the UMTS link is activated and voice transmissions are exchanged with the telecom network.

The DVB-T receiver 402 of the mobile terminal 400 is activated or deactivated by the CPU 404. The DVB-T receiver 402 can be activated manually by the user such as when the user wishes to receive a broadcast movie or is expecting to receive a broadcast file. The CPU 404 receives the service parameters associated with a current or future broadcast by accessing the Portal Server 120 via the UMTS/GPRS network 110. The reception of the service parameters can be initiated by the user (by clicking a link) or automatically by preprogrammed action by the user. Furthermore, push services can be implemented in the UMTS/GPRS network to send a message which is displayed to notify the user that a desired TV program will be broadcasting in e.g. 5 minutes and to confirm whether the user wishes to view it via a dialog box, for example. A message and dialog box could display something like: "The World News will be broadcast in 5 minutes. If you would like to view the broadcast select 'OKAY' else select 'CANCEL'."

The DVB-T receiver 402 is equipped with a timing element 418 enabling it to remain synchronous with the digital broadcast network. The timer 418 makes it possible to switch on the receiver and pick up the selected data packets after a long period (perhaps days) after the last system synchronization. The timer 418 also enables the CPU 404 to provide power management by powering down the DVB-T and other activities when not in use. For example, video functionality is automatically shut down when not in use i.e. digital broadcasts that are not currently in use or not needed such as when web browsing or making voice calls.

Figure 5:
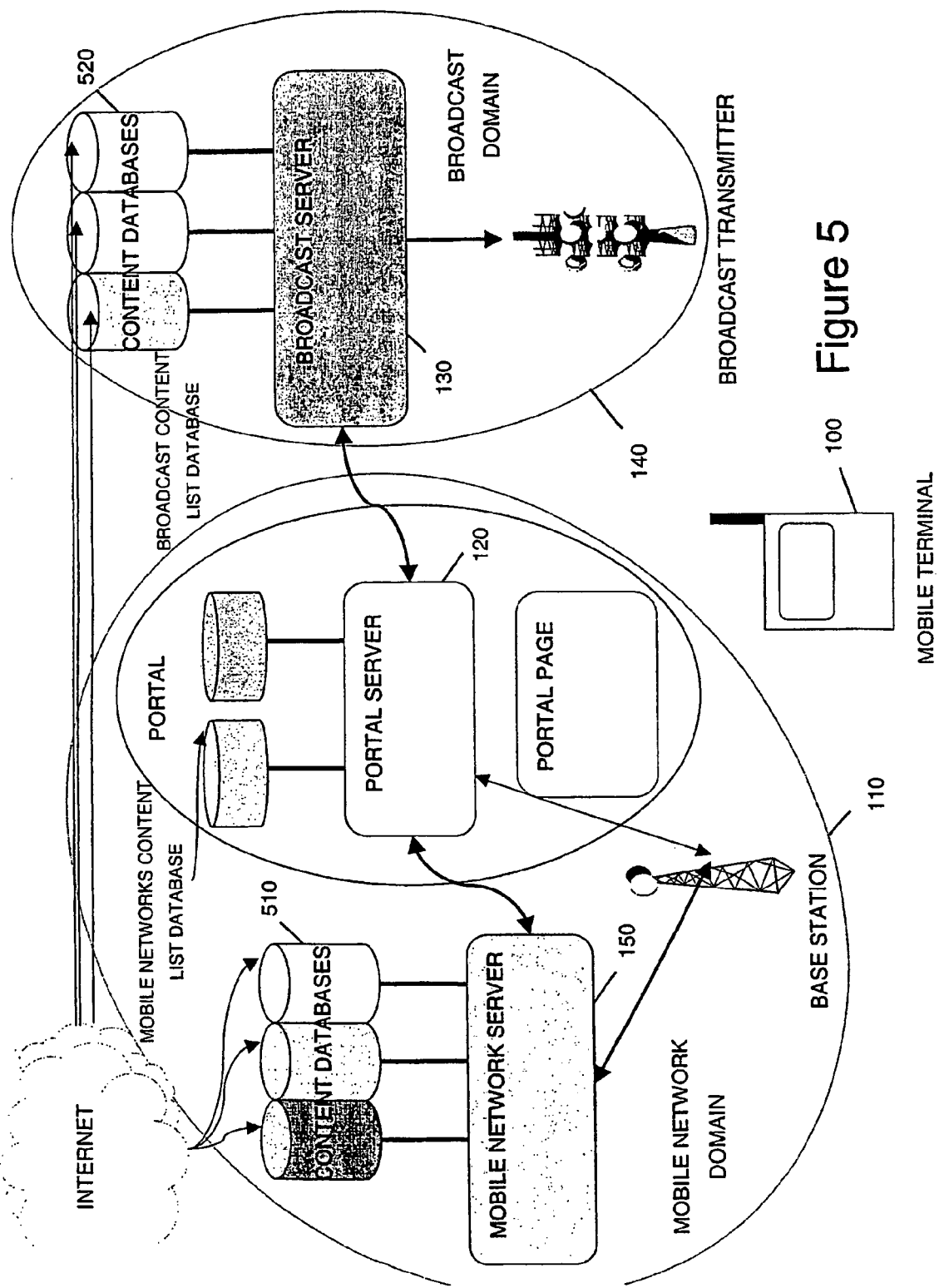
FIG. 5 illustrates a second embodiment of the invention that depicting the detailed use of an exemplary hybrid network portal and its interrelation with data content residing on the telecom and broadcast networks.

FIG. 5 illustrates a second embodiment of the invention that depicting the detailed use of an exemplary hybrid network portal 120 and its interrelation with data content residing on the telecom and broadcast networks. The content databases 510 in telecom side and content databases 520 on the broadcast side can be maintained by different operators and can be linked to the portal server 120. The list of databases (information about the content) are connected to the portal server such that users can have access to the content via portal through a portal page from the mobile terminal 100. Use of the hybrid network portal permits allows a single access point for services from different networks, whereby some services can be delivered through the telecommunications network and others can be delivered through broadcast network. The broadcast service parameters are sent using bi-directional mobile network to the mobile terminal instead of sending Electronic Program guide (EPG) or service announcement tables through broadcast network. This dramatically decreases the power consumption of the mobile terminal since the DVB-T receiver is activated only when broadcast transmissions are occurring which replaces the need for continuous monitoring of the DVB-T network for available services. Furthermore, the single access point of the portal page interface operates independently of the protocol or channel used to access the services.

Figure 6:
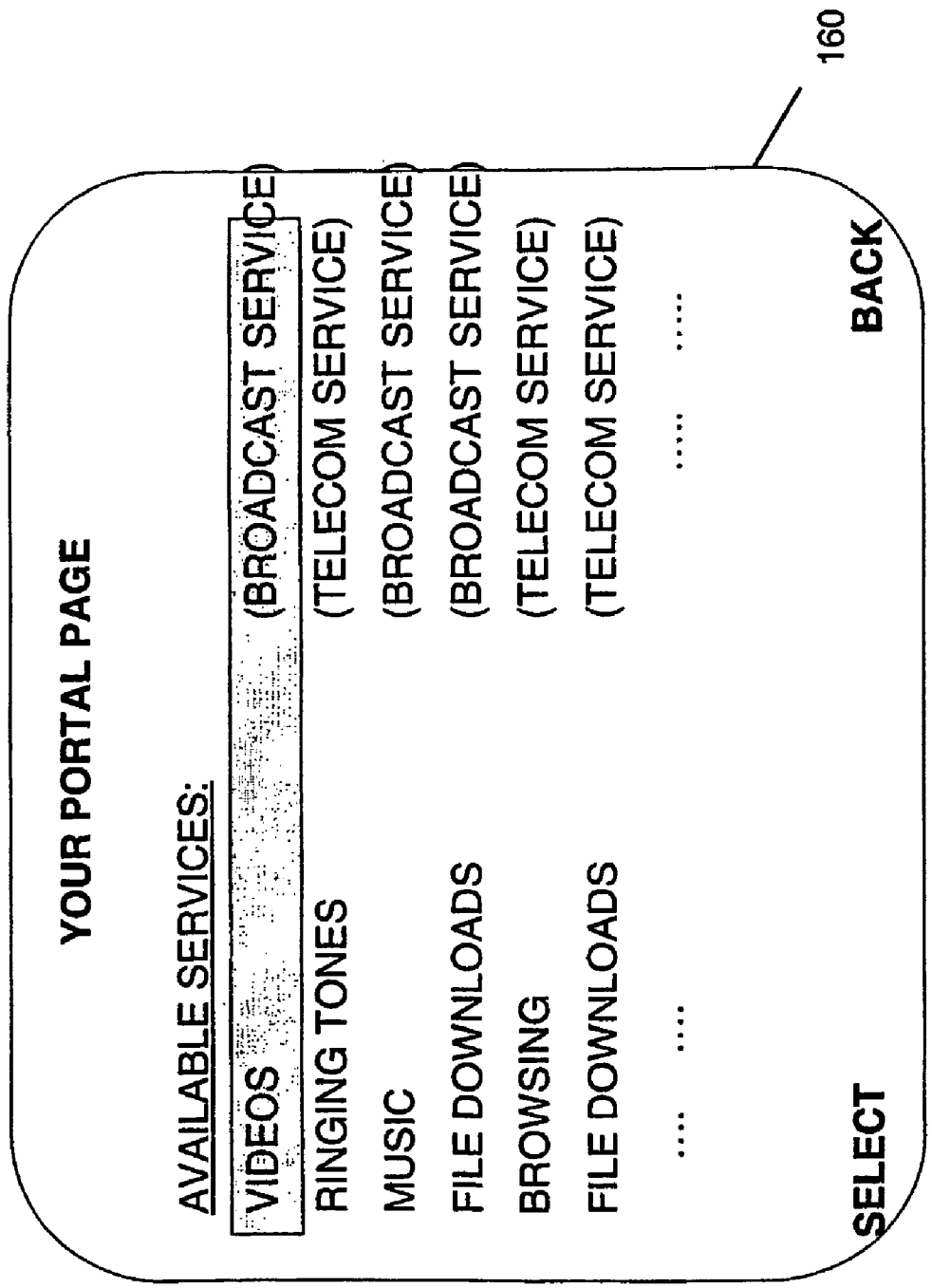
FIG. 6 depicts a user interface of a portal page downloaded on terminal display according to the second embodiment of the invention.

FIG. 6 depicts an exemplary portal page 160 and user interface of selectable services downloadable to terminal in accordance with the second embodiment of the invention. The exemplary portal page shows choices for the user to select between Broadcast Services and Telecom Services. Examples of Broadcast Services may include: videos, music (in a digital format), and large file downloads such as programs, games etc. Such broadcast services may be continuously broadcasted in a e.g. a carousel fashion over the air. Examples of Telecom Services provided, in addition to conventional voice services, may include downloading ringing tones, browsing, and some file downloads. The portal page represents a convenient access point describing available services in a quick and efficient manner using a wireless data protocol such as WAP.

Figure 7:
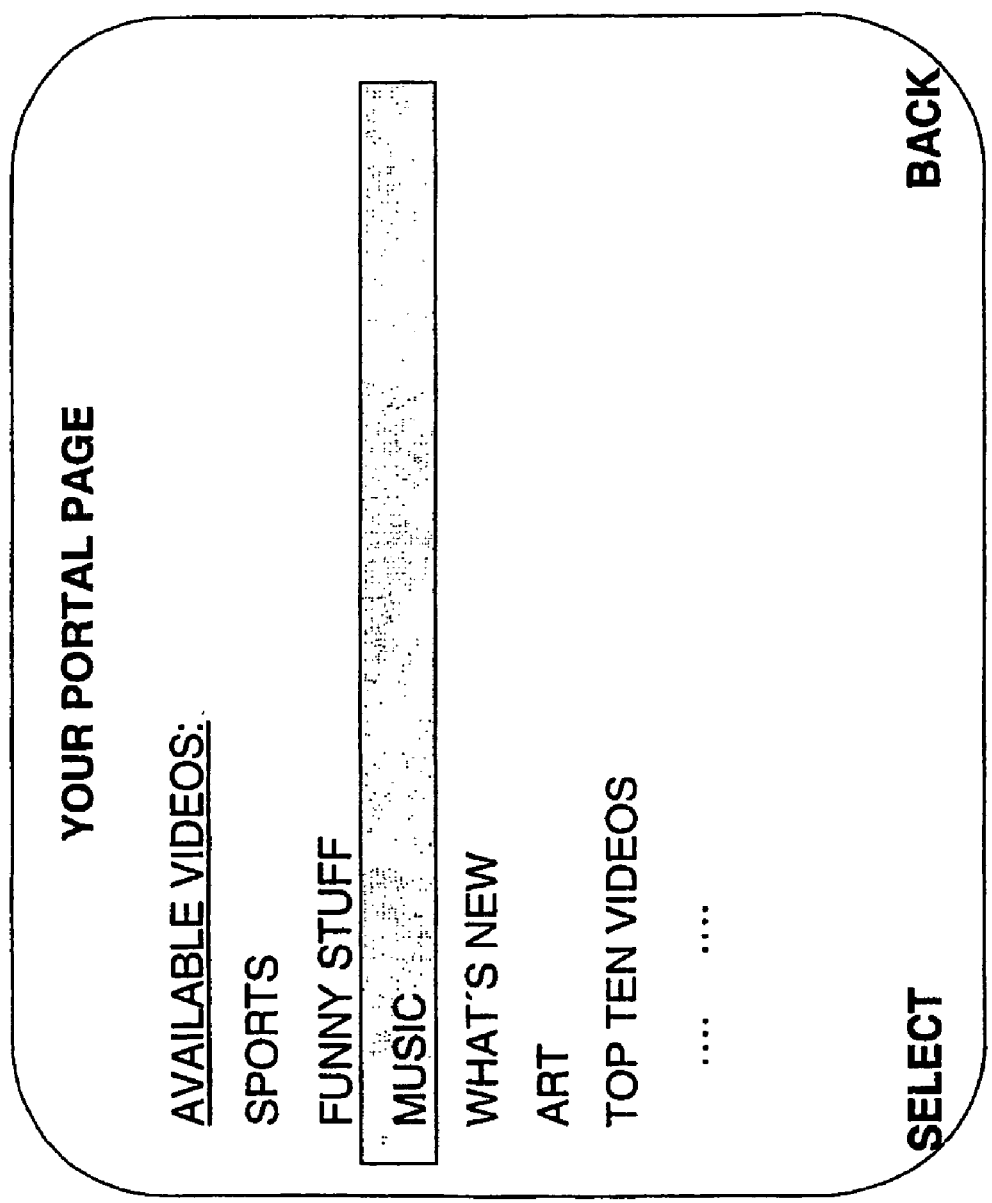
FIG. 7 depicts a user interface of selectable services downloadable to terminal according to the second embodiment of the invention.
Figure 8:
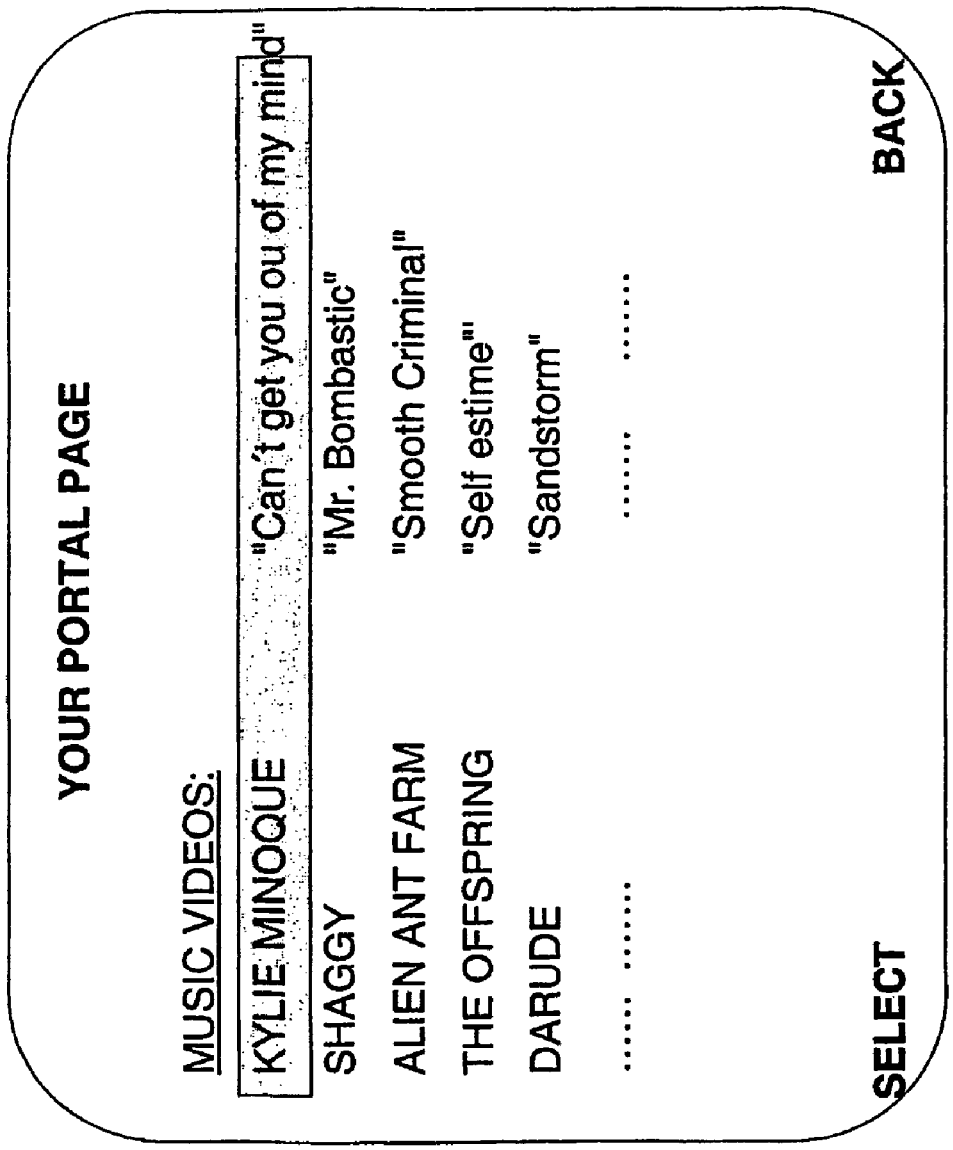
FIG. 8 depicts a user interface of selected music video services downloadable to terminal according to the second embodiment of the invention.

FIG. 7 depicts an exemplary portal page obtained after the user has selected "videos" from the prior portal page of FIG. 6. The user interface shows selectable video services downloadable to terminal. Similarly, various types of videos are available which include e.g. sports, funny stuff, music, what's new, art, top ten videos as shown in the figure. A further selection of a topic on this page leads to a subsequent page containing more detailed information on the selected topic. By way of example, if the topic "music" is selected, the user gets a selection of music available for reception as shown in FIG. 8. This "music" page depicts a user interface showing selected music video services downloadable to terminal. At the same time, the service information parameters are sent to the mobile terminal permitting the broadcast receiver to correctly receive the broadcast of the selected song.

Figure 9:
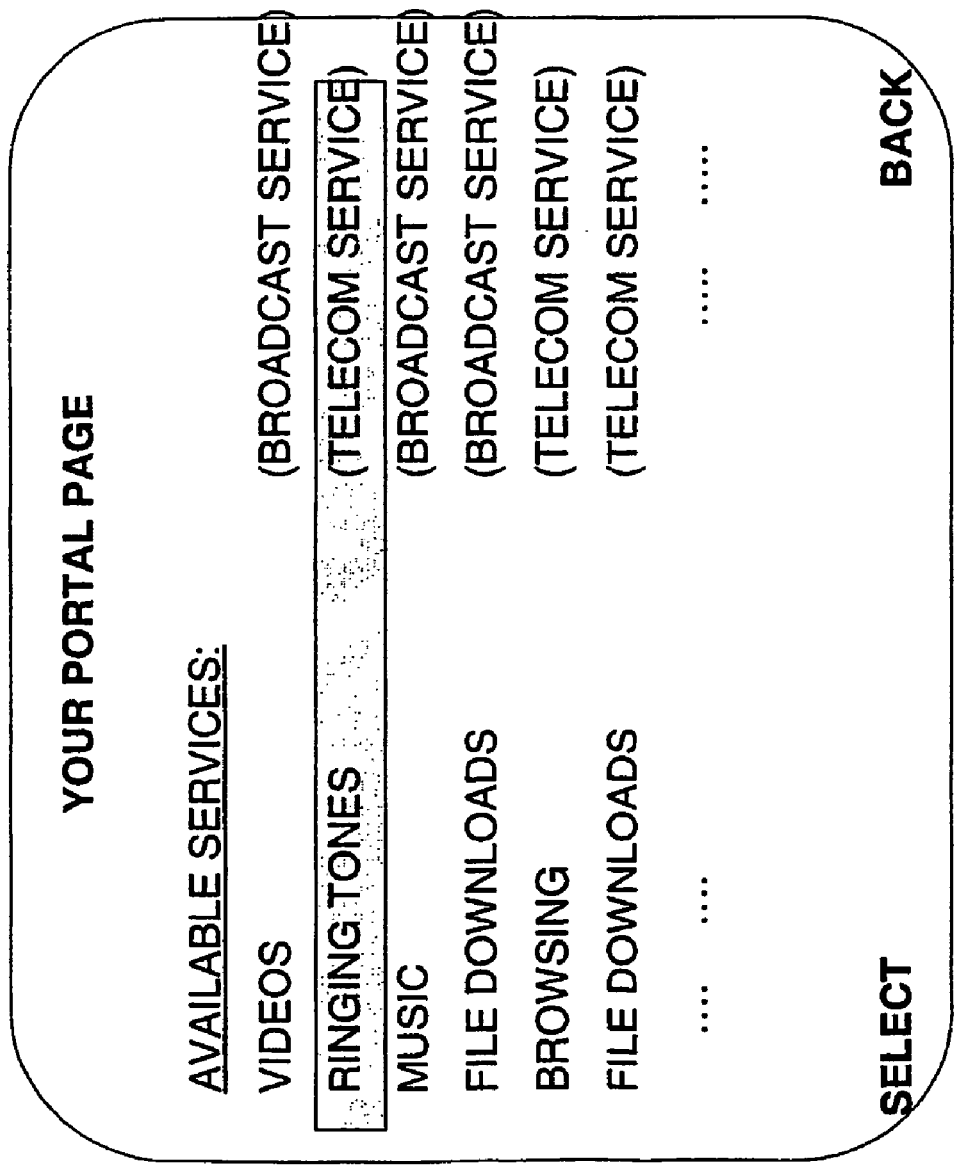
FIG. 9 depicts a user interface of selectable telecom services downloadable to terminal according to the second embodiment of the invention.
Figure 10:
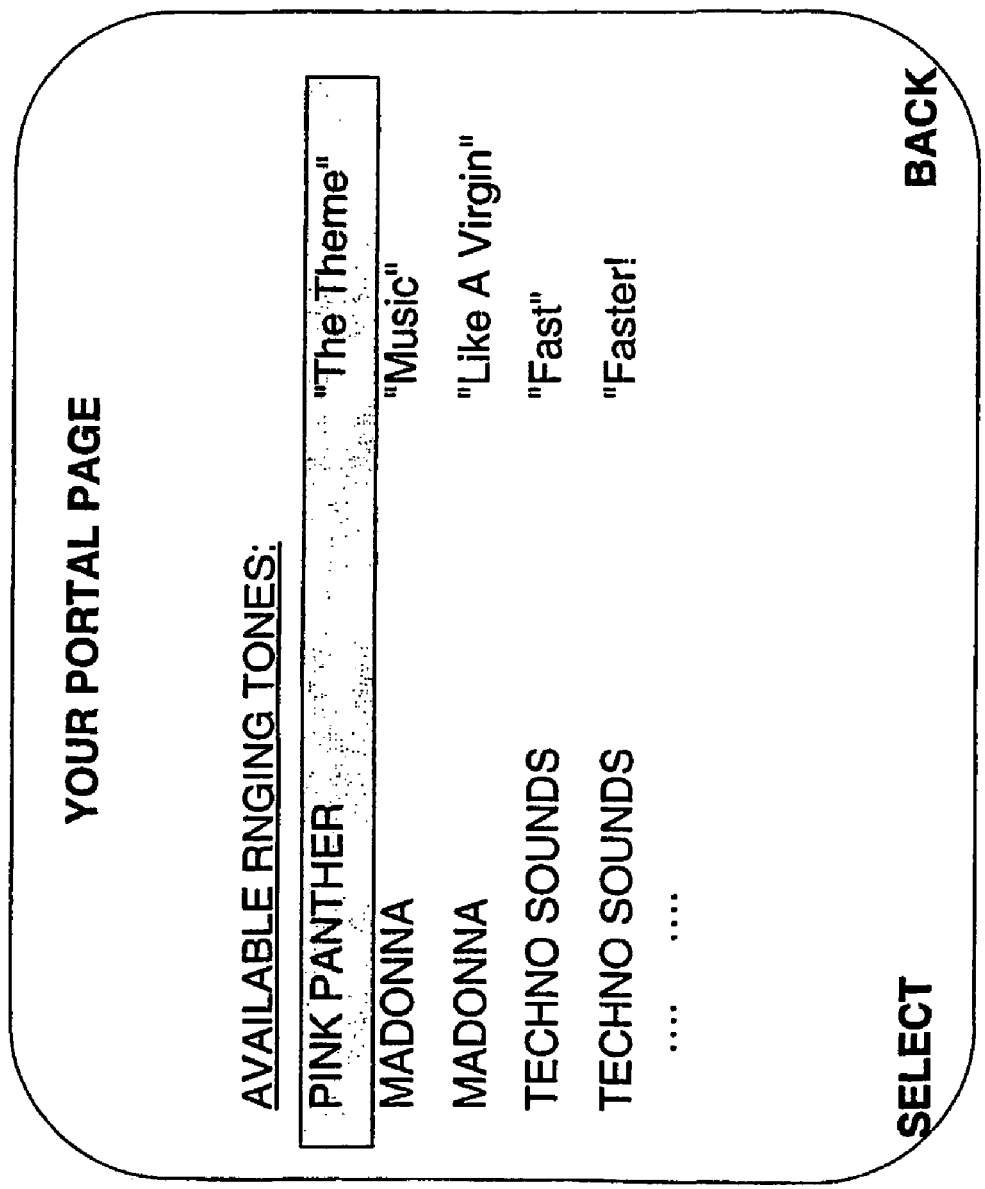
FIG. 10 depicts a user interface of selectable ringing tones downloadable to terminal according to the second embodiment of the invention.

FIG. 9 shows a an example of a portal page and user interface of selectable telecom services downloadable to terminal according to the second embodiment. The page depicts a number of selectable telecom services, which are identified as such to indicate the network used. In the event that the user selects "Ringing Tones", as shown in the figure, a new page is fetched displaying various ring tones that the user may wish to receive. FIG. 10 depicts an exemplary page presenting various ring tones for the user to download. The ring tones may be located on the Telecom server 120 or on an Internet Server 100 offered by a third party. The reception of downloaded telecom services typically operate via the telecom network in a manner consistent with UMTS, GPRS, and GSM protocols which may involve WAP or other wireless data protocols.

Although the invention has been described in some respects with reference to a specified embodiment thereof, variations and modifications will become apparent to those skilled in the art. For example, ft is possible to adapt the invention to broadcast and receive digital audio broadcasts (DAB), which is an international digital standard for radio stations that is slated to replace analog broadcasts. Furthermore, it may be possible to utilize a broadcast function operable with UMTS networks for delivering data to multiple users. It is therefore the intention that the following claims not be given a restrictive interpretation but should be viewed to encompass variations and modifications that are derived from the inventive subject matter disclosed.

The invention claimed is:

1. A system comprising:
a mobile telecommunication network;
at least one mobile telecommunication service server coupled to the mobile telecommunication network for providing lower bandwidth services;
a broadcast network;
at least one broadcast service server coupled to the broadcast network for providing broadband services; and
a portal server coupled to the mobile telecommunication network and the at least one broadcast service server, said servers communicating with a mobile terminal via the mobile telecommunication network for providing information relative to the services, wherein the mobile terminal comprises a mobile telecommunication network transceiver and a broadcast network receiver, and wherein the portal server is configured to host a portal page so that the portal server is configured to provide a single point of access to services, wherein the portal page is configured to provide the information relative to the services so that the services are selectable depending on content, and wherein the portal server is configured to provide said single point of access to both lower bandwidth services and broadband services depending on the content.

2. The system according to claim 1, wherein the mobile terminal is capable of receiving the provided services independent of the service using the information relative to the services provided by the portal server.

3. The system according to claim 1, wherein the mobile terminal is a multimedia terminal comprising voice and packet data telecommunication functionality, a browser for interfacing with the packet data, and a broadcast receiver for receiving digital broadcasts from the broadcast network.

4. The system according to claim 1, wherein the mobile terminal includes a browser capable of operating with a wireless application protocol or a hyper text transmission protocol for transmitting and receiving packet data with the mobile telecommunication network.

5. The system according to claim 1, wherein the lower bandwidth services comprise mobile services and packet data services transmitted via the mobile telecommunication network.

6. The system according to claim 1, wherein the mobile telecommunication network comprises a network wherein packet data is capable of being exchanged between the network and the mobile terminal.

7. The system according to claim 1, wherein the broadband services comprise digital broadcast services.

8. The system according to claim 1, wherein the broadcast network is a digital broadband broadcast network.

9. The system according to claim 8, wherein the broadcast service is broadcast to the mobile terminal from the broadcast server via the digital broadband broadcast network.

10. The system according to claim 1, wherein the portal page provides the information relative to the services to the mobile terminal.

11. The system according to claim 1, wherein the portal page is hosted on the portal server and displayed on the mobile terminal in the form of selectable hyperlinks.

12. The system according to claim 1, wherein the mobile telecommunication network and the broadcast network each host a connection to the Internet for accessing content from servers from the Internet.

13. An apparatus comprising:
an access point for accessing selectable service information relative to broadband service transmissions and lower bandwidth service transmissions; and
a controller for selecting service information for said broadband and lower bandwidth service transmissions based on a service request by a user of said apparatus,
wherein said apparatus is coupled to a broadband network, at least by the access point, and to a lower bandwidth network, at least by the access point, for providing service information relative to said requested service to the user,
wherein the apparatus is configured to host a portal page so that the apparatus is configured to provide a single point of access to services, wherein the portal page is configured to provide service information relative to the services so that the services are selectable depending on content, and wherein said apparatus is configured to provide said single point of access to both lower bandwidth services and broadband services depending on the content.

14. The apparatus of claim 13, wherein the apparatus further comprises a router for routing the service request by the user to a selected service provider.

15. The apparatus of claim 13, wherein the apparatus further comprises a transmitter for transmitting the selected service information to the mobile terminal based on the service request by the user of the apparatus.

16. A method comprising:
accessing, by a mobile terminal, a telecommunication system for receiving voice, packet data, and broadcast services,
wherein said telecommunication system comprises,
a mobile network linked to a telecom server and a portal server; and
a broadcast network linked to a broadcast server and to the mobile network;
sending a request from the mobile terminal for a broadcast service to said portal server;
receiving, at the mobile terminal by a mobile telecommunication network transceiver, via the mobile network, service information relative to said requested broadcast service from the portal server; and
communicating with the mobile network and receiving said requested broadcast service at the mobile terminal from the broadcast network by a broadcast network receiver,
wherein the portal server is configured to host a portal page so that the portal server is configured to provide a single point of access to services, wherein the portal page is configured to provide service information relative to the services so that the services are selectable depending on content, and wherein the portal server is configured to provide said single point of access to both lower bandwidth services and broadband services depending on the content.

17. The method according to claim 16 wherein the mobile network exchanges packet data with the mobile terminal using the UMTS/GPRS protocol.

18. The method according to claim 16 wherein the broadcast network broadcasts signals in accordance with a digital video broadcasting standard.

19. A method according to claim 16, wherein the mobile terminal comprises mobile voice and packet data telecommunication functionality, a browser for interfacing with the packet data, and a broadcast receiver for receiving digital broadcasts from the broadcast network.

20. The method according to claim 16 wherein the mobile network is a voice and packet data capable network.

21. The method according to claim 16, wherein accessing the portal page and data communication with the mobile network are performed using a wireless application protocol or a hyper text transmission protocol.

22. The method according to claim 16 wherein the broadcast services include at least one of TV programs, movies, digital radio, music files, data files, or interactive games which are broadcasted in a carousel or streaming manner over the air.

23. The method according to claim 16 wherein the received service information includes at least one of a tuning frequency, IP address, Program ID (PID), time, or encryption keys for enabling the reception of the broadcast service.

24. The method according to claim 16 wherein the service information is requested from the mobile network and retrieved from the broadcast network via the Internet, especially if they are geographically distant.

25. The method according to claim 16 wherein the broadcast network broadcasts digital audio using digital video broadcasting or a moving picture expert group format.

26. The method according to claim 16 wherein the broadcast services are broadcast by the mobile network using a native broadcast functionality in a universal mobile telecommunications system.

27. The method according to claim 16, wherein the mobile terminal can be preprogramed to display or save broadcasted content starting at the appropriate scheduled time of the broadcast.

28. An apparatus comprising:
a mobile radio frequency transceiver for communicating with a mobile telecommunication network for receiving lower bandwidth services;
a broadcast receiver for receiving broadband services from a digital broadcast network;
an input user interface including selectable links to access service information relative to said broadband and said lower bandwidth services for entering a user request to request a service, said request to be transmitted to a portal server via the mobile telecommunication network;
a CPU connected to said mobile radio frequency transceiver and to said broadcast receiver for controlling communication with the mobile telecommunication network and the reception of broadband services; and
a display for displaying the requested service to the user, wherein said mobile radio frequency transceiver receives service information relative to the requested service from said portal server, and wherein the portal server is configured to host a portal page for said service information so that the portal server is configured to provide a single point of access to services, wherein the portal page is configured to provide service information relative to the services so that the services are selectable depending on content, and wherein the portal server is configured to provide said single point of access to both lower bandwidth services and broadband services depending on the content.

29. The apparatus according to claim 28, wherein the apparatus further comprises a media decoder connected to the broadcast receiver and the CPU to decode the broadcast content received over the air.

30. The apparatus according to claim 28, further comprising a speaker for reproducing high quality audio associated with the broadcast content.

31. An article of manufacture comprising a computer-readable medium containing program code that when executed causes a computing system to:
receive a user request from a mobile terminal for information necessary for receiving broadcast content, said request being sent via a mobile telecommunication network and received by a mobile telecommunication network transceiver;
execute the user request and send the information to the mobile terminal using packet data transmission;
facilitate communication between the mobile telecommunication network and a broadcast network hosting the broadcast content;
perform transmission of the broadcast content from the broadcast network to a broadcast receiver of the mobile terminal; and
host a portal page so as to provide a single point of access to services, wherein the portal page is configured to provide service information relative to the services so that the services are selectable depending on content, and further to provide said single point of access to both lower bandwidth services and broadband services depending on the content.

32. The article of manufacture according to claim 31, wherein the computer-readable medium further contains program code that when executed causes the computing system to operate a telecom server and/or a portal server connected to the mobile telecommunication network.

33. The article of manufacture according to claim 31, wherein the computer-readable medium further contains program code that when executed causes the computing system to operate a broadcast server connected to the broadcast network and to the mobile telecommunication network.

34. The article of manufacture according to claim 31 wherein the sending information necessary for receiving the broadcast content, such as frequency, time, PID, or IP address port, to the mobile terminal is implemented in a data transmission protocol such as WAP or HTTP.

35. A computer readable medium having stored thereon an electronic program guide comprising:
information on broadband services provided by a broadband network, wherein the electronic program guide is configured such that:
said information is accessible to a wireless mobile terminal having a mobile telecommunication network receiver via a portal page communicated through a mobile telecommunication network, and
wherein broadcast service parameters associated with a user selected broadcast service are sent to a broadcast network receiver of the wireless mobile terminal via a portal server coupled to the broadband network and the mobile telecommunication network, and
wherein the portal server is configured to host the portal page so that the portal server is configured to provide a single point of access to services, wherein the portal page is configured to provide service information relative to the services so that the services are selectable depending on content, and wherein the portal server is configured to provide said single point of access to both lower bandwidth services and broadband services depending on the content.

36. The system according to claim 1, wherein the portal server including a the portal page, is accessible by the mobile telecommunication network.

37. The system according to claim 1, wherein a the portal page hosted on the portal server is displayed on the mobile terminal in the form of selectable hyperlinks.

38. The apparatus according to claim 13, wherein the apparatus including a the portal page, is accessible by a mobile telecommunication network.

39. The apparatus according to claim 13, wherein the portal page hosted on the apparatus is displayed on the mobile terminal in the form of selectable hyperlinks.

40. The method according to claim 16, wherein the portal server including the portal page, is accessible by the mobile network.

41. The method according to claim 16, wherein the portal page hosted on the portal server is displayed on a mobile terminal in the form of selectable hyperlinks.

42. An apparatus comprising:
  means for mobile communicating with a mobile telecommunication network for receiving lower bandwidth services;
  means for receiving broadband services from a digital broadcast network;
  means for selecting links to access service information relative to said broadband and said lower bandwidth services for entering a user request to request a service, said request to be transmitted to a portal server via the mobile telecommunication network;
  means for controlling communication with the mobile telecommunication network and the reception of broadband services; and
  means for displaying the requested service to the user,
  wherein said mobile communicating means receives service information relative to the requested service from said portal server via the mobile telecommunication network, and wherein the portal server is configured to host a portal page for said service information so that the portal server is configured to provide a single point of access to services, wherein the portal page is configured to provide service information relative to the services so that the services are selectable depending on content, and wherein the portal server is configured to provide said single point of access to both lower bandwidth services and broadband services depending on the content.

* * * * *